(12) United States Patent
Akutsu

(10) Patent No.: US 8,235,467 B2
(45) Date of Patent: Aug. 7, 2012

(54) VEHICLE SEAT

(75) Inventor: Takeshi Akutsu, Shioya-gun (JP)

(73) Assignee: TS Tech Co., Ltd., Saitama-Ken (JP)

( * ) Notice: Subject to any disclaimer, the term of this patent is extended or adjusted under 35 U.S.C. 154(b) by 519 days.

(21) Appl. No.: 12/298,760

(22) PCT Filed: Apr. 27, 2007

(86) PCT No.: PCT/JP2007/059270
§ 371 (c)(1),
(2), (4) Date: Aug. 6, 2009

(87) PCT Pub. No.: WO2007/126089
PCT Pub. Date: Nov. 8, 2007

(65) Prior Publication Data
US 2010/0066145 A1  Mar. 18, 2010

(30) Foreign Application Priority Data

Apr. 27, 2006 (JP) ................................ 2006-124540
Apr. 27, 2006 (JP) ................................ 2006-124541
Apr. 27, 2006 (JP) ................................ 2006-124542

(51) Int. Cl.
*B60N 2/66* (2006.01)
(52) U.S. Cl. .................................................. 297/284.4
(58) Field of Classification Search ............... 297/284.4
See application file for complete search history.

(56) References Cited

U.S. PATENT DOCUMENTS

| 5,076,643 | A | * | 12/1991 | Colasanti et al. | 297/284.6 |
| 6,079,783 | A | * | 6/2000 | Schuster et al. | 297/284.4 |
| 6,139,102 | A | * | 10/2000 | von Moller | 297/284.4 |
| 6,189,972 | B1 | * | 2/2001 | Chu et al. | 297/284.4 |
| 6,296,308 | B1 | * | 10/2001 | Cosentino et al. | 297/284.4 |
| 6,918,633 | B2 | * | 7/2005 | Forkel et al. | 297/284.4 |
| 7,270,374 | B2 | * | 9/2007 | Moriggi | 297/284.4 |
| 7,290,837 | B2 | * | 11/2007 | Sugiyama et al. | 297/452.55 |
| 2006/0226683 | A1 | * | 10/2006 | Massara et al. | 297/284.4 |
| 2009/0001785 | A1 | * | 1/2009 | Swan et al. | 297/216.12 |

* cited by examiner

*Primary Examiner* — Peter R. Brown
(74) *Attorney, Agent, or Firm* — Browdy and Neimark, PLLC

(57) ABSTRACT

A vehicle seat comprises a cushion plate mounted on upper and lower seat springs, a seat cushion provided on a front side of the cushion plate, an auxiliary plate provided between the seat cushion and the cushion plate for pushing out the seat cushion forward. The cushion plate includes an upper plate located higher than the lower seat spring and a lower plate located lower than the lower seat spring. The lower plate has such elastic force that when the lower plate receives, through the seat back cushion, pressure from a person properly seated on the seat, the lower plate can move backward by a greater distance than the distance of rearward movement of the lower seat spring.

12 Claims, 10 Drawing Sheets

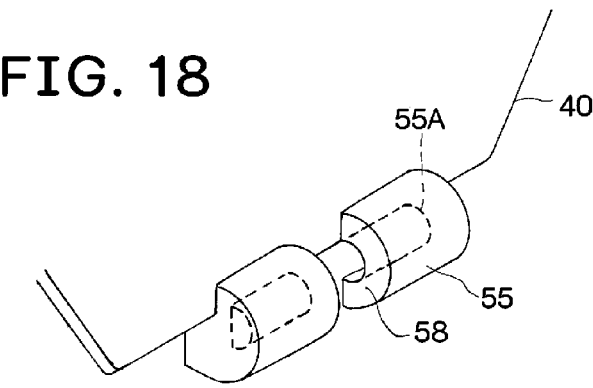
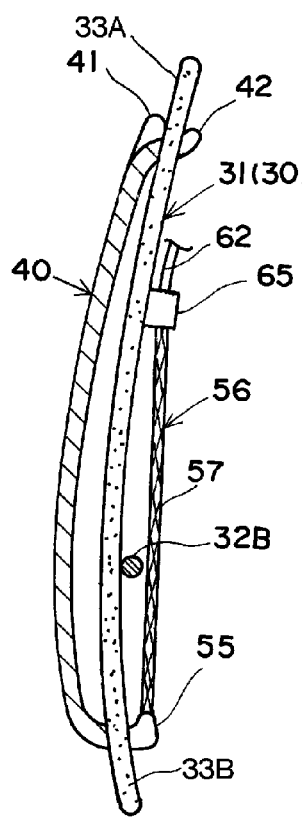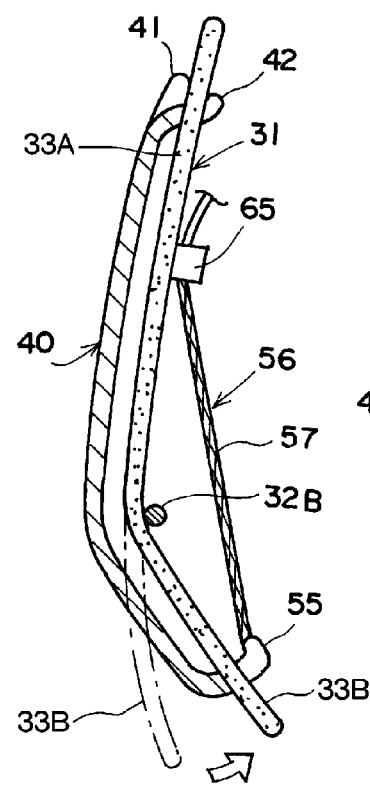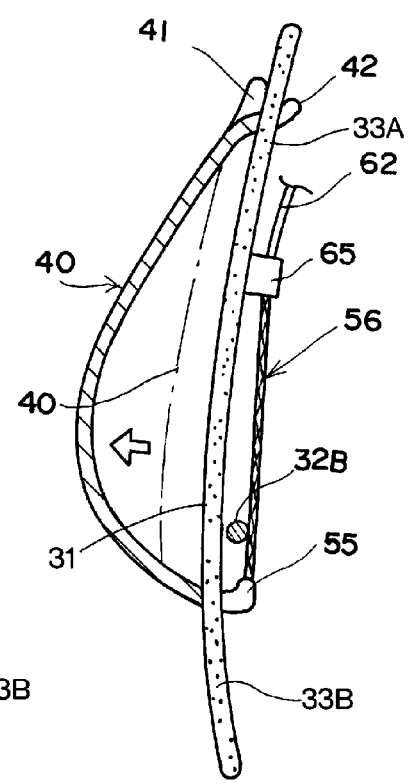

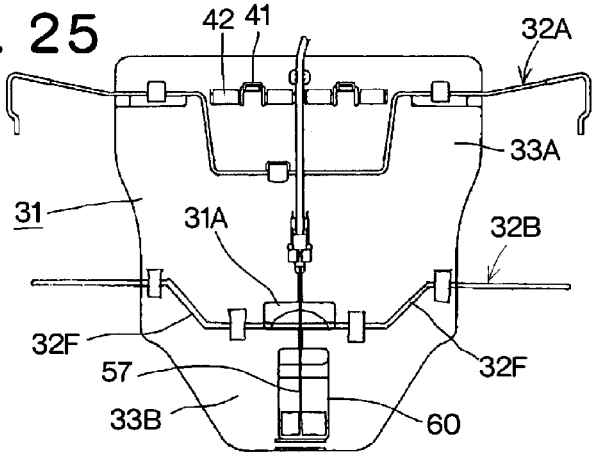
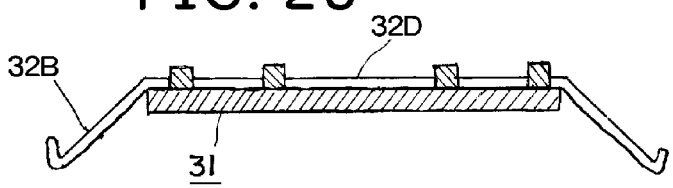
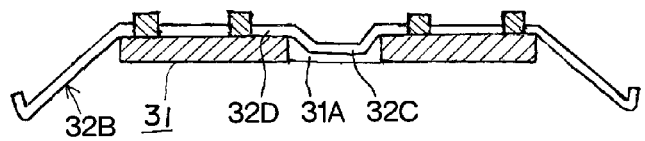
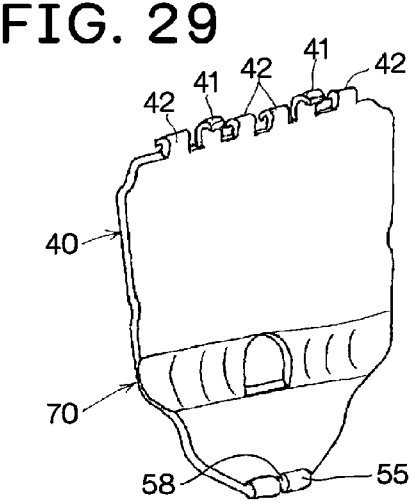
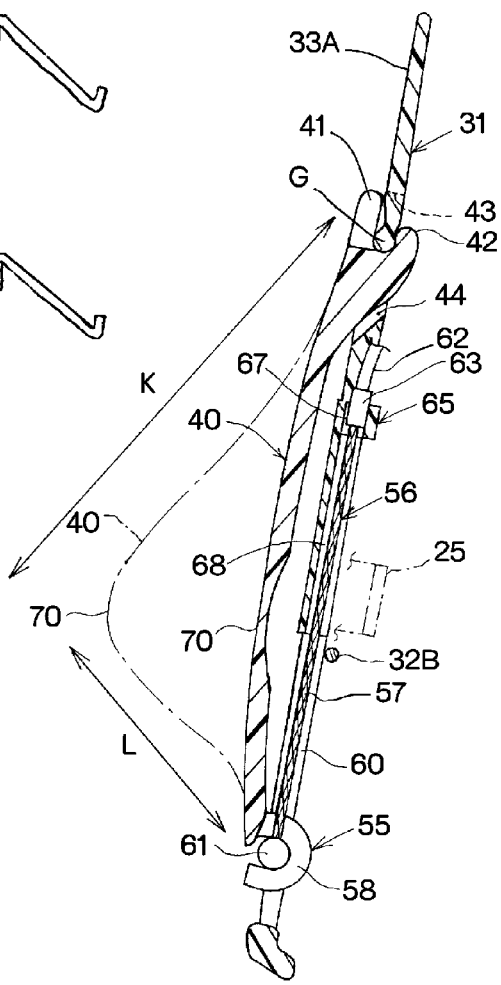

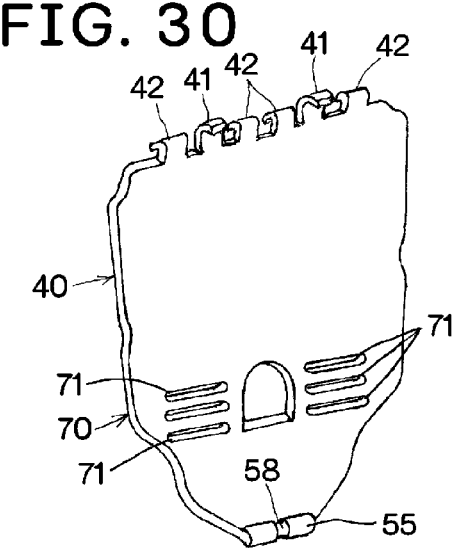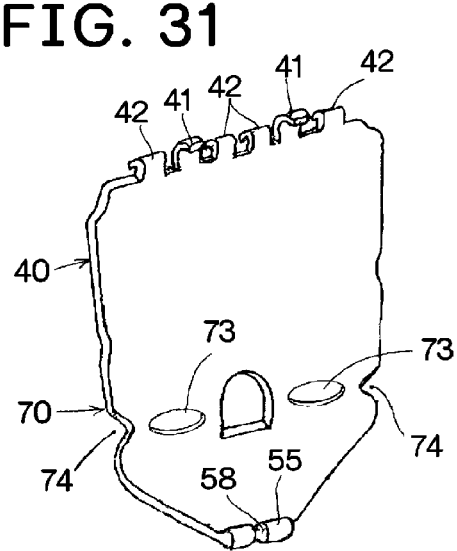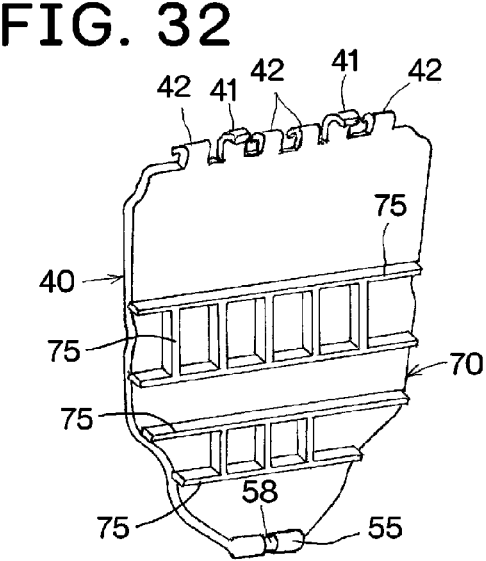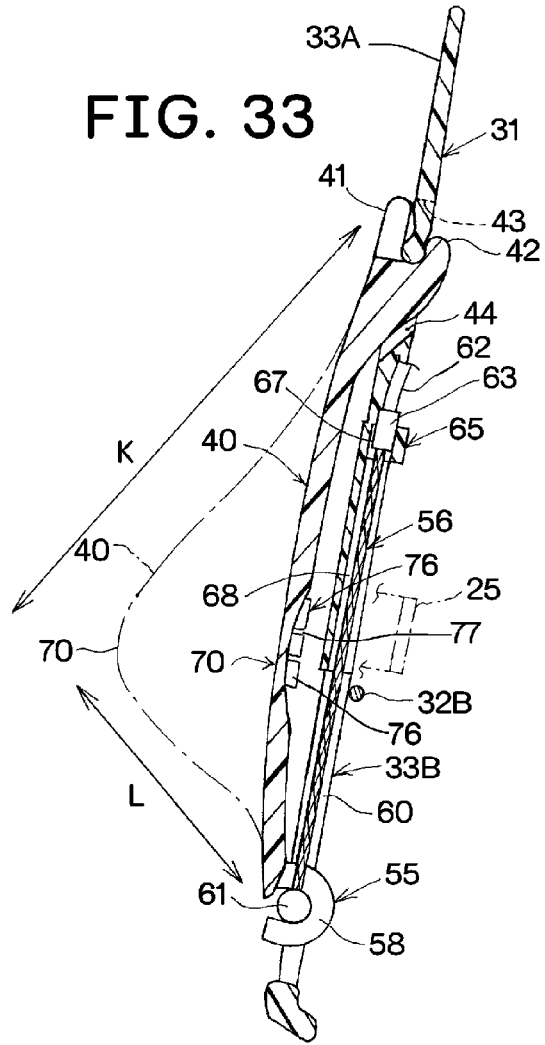

VEHICLE SEAT

TECHNICAL FIELD

The present invention relates to a vehicle seat, and particularly, to a vehicle seat having an adjusting mechanism of a cushion pressure.

BACKGROUND ART

A conventional seat back cushion of a vehicle seat is resiliently supported by a large number of seat springs mounted between side frames of a seat back frame. The seat spring is generally a zigzag spring or a formed wire spring.

There is a known vehicle seat in which a cushion plate is disposed behind the seat back cushion, and the cushion plate is supported by a seat back frame by means of seat springs (Patent Document 1 for example).

There is a known vehicle seat in which the cushion plate is provided with an auxiliary plate which moves backward and forward, and a cushion pressure is changed by the movement of the auxiliary plate (Patent Document 2 for example).
Patent Document 1: JP 2006-021616 A
Patent Document 2: JP 11(1999)-206506A

DISCLOSURE OF THE INVENTION

A vehicle seat having the cushion plate and the auxiliary plate mounted on the cushion plate has a merit that a lumbar support pressure can be adjusted excellently, but it is difficult to support a portion of a human body lower than a lumbar, e.g., a hip portion at a comfortable pressure.

Hence, it is an object of the present invention to provide a vehicle seat having an excellent flexibility with respect to a figure of a person seated on the seat.

BRIEF DESCRIPTION OF THE DRAWINGS

FIG. 18 is a perspective view of the lower engaging portion of the auxiliary plate;
FIG. 19 is a sectional view when the cushion plate and the auxiliary plate are substantially in parallel to each other;
FIG. 20 is a sectional view showing a state where a lower plate of the cushion plate shown in FIG. 19 is pushed out backward;
FIG. 21 is a sectional view showing a state where the auxiliary plate is projected forward;
FIG. 25 is a back view of a cushion plate provided with a lower seat spring including an upper inclining portion;
FIG. 26 is a sectional view taken along the X-X line in FIG. 23;
FIG. 27 is a sectional view taken along the Y-Y line in FIG. 23;
FIG. 28 is a sectional view showing the auxiliary plate having bending means and the cushion plate;
FIG. 29 is a perspective view of the auxiliary plate having the bending means;
FIG. 30 is a perspective view of the auxiliary plate having the bending means;
FIG. 31 is a perspective view of the auxiliary plate having the bending means;
FIG. 32 is a perspective view of the auxiliary plate having the bending means;
FIG. 33 is a sectional view showing a cushion plate and the auxiliary plate having bending means and a bending-restricting means.

BEST MODE FOR CARRYING OUT THE INVENTION

Figure 1:
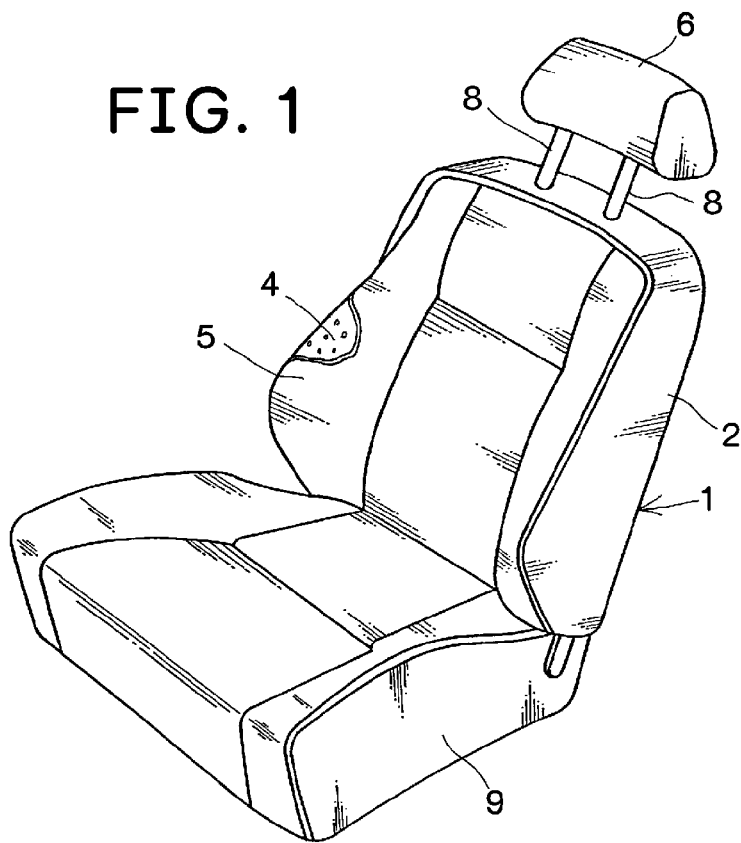
FIG. 1 is a perspective view of a vehicle seat.
Figure 2:
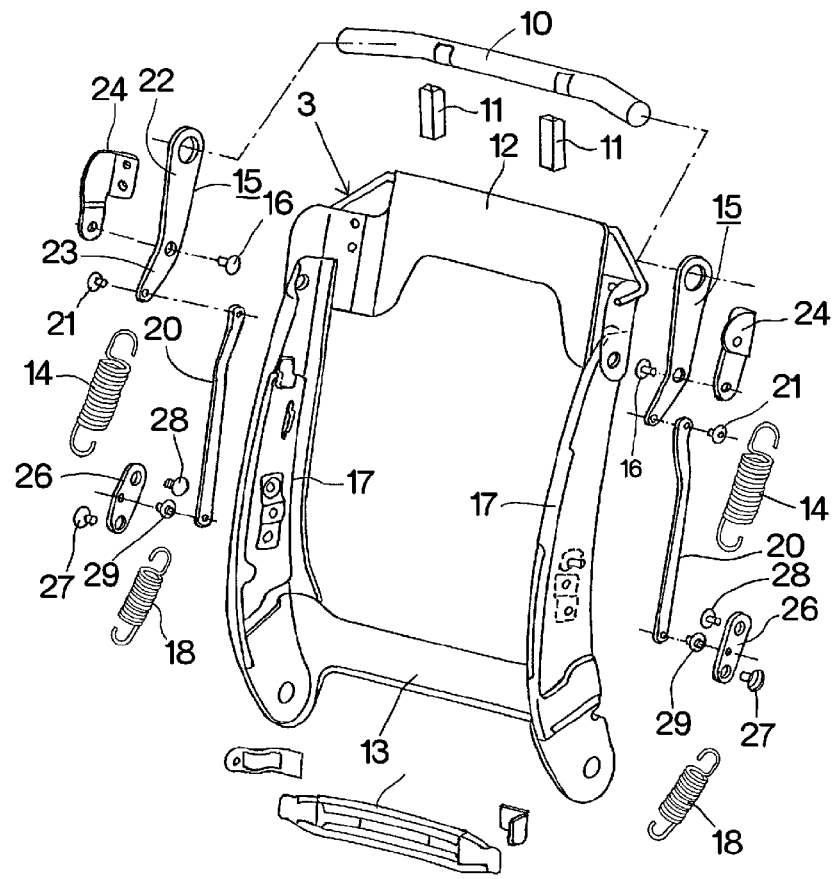
FIG. 2 is an exploded perspective view of basic parts of a seat back frame of the vehicle seat and an active head rest mechanism.
Figure 3:
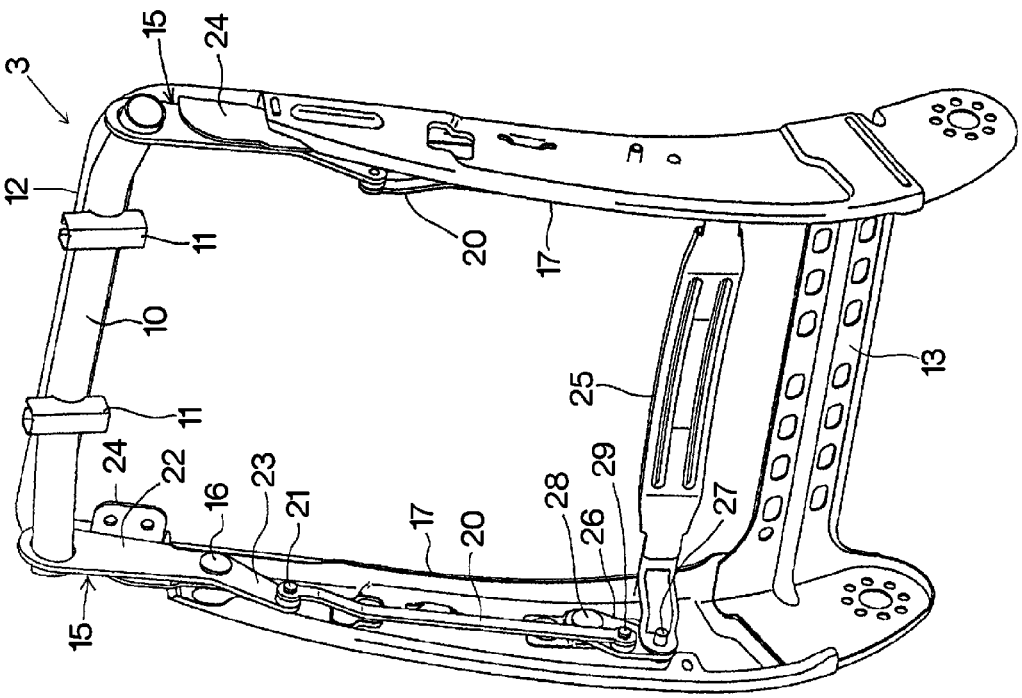
FIG. 3 is a perspective view showing an assembled state of FIG. 2.

An embodiment of the present invention will be explained with reference to the drawings. A vehicle seat 1 of the invention includes a seat back 2, a seat bottom 9, and a head rest 6 provided on an upper portion of the seat back 2. A seat back frame 3 of the seat back 2 has a pair of side frames 17, an upper frame 12 and a lower frame 13, and the seat back frame 3 is a square frame in shape. The vehicle seat 1 includes a cushion 4 covered with a leather member 5.

A head rest support portion 10 is disposed near the upper frame 12. The head rest support portion 10 can move with respect to the seat back frame 3 and extends laterally. Vertical engaging portions 11 are fixed to the head rest support portion 10. Lower portions of pillars 8 of the head rest 6 are inserted into the vertical engaging portions 11. The pillars 8 are supported by the vertical engaging portions 11 such that heights of the pillars 8 can be adjusted.

An upper portion of each side frame 17 or each end of the upper frame 12 is provided with a bracket 24. An upper link or a bell crank 15 is rotatably mounted on the bracket 24 by means of a shaft 16. Each upper link 15 includes an upper long arm 22 extending upward, and a lower short arm 23 extending forward and downward. The upper link 15 is biased in the clockwise direction in FIG. 5 by a elastic force of the upper spring 14. The spring 14 has a first end connected to the upper link 15 and a second end connected to the side frame 17. Left and right both sides of the head rest support portion 10 are connected to upper arms 22 and 22, respectively. The lower short arm 23 is fixed to an upper portion of a vertically long connecting rod 20 by means of a pin 21.

Figure 5:
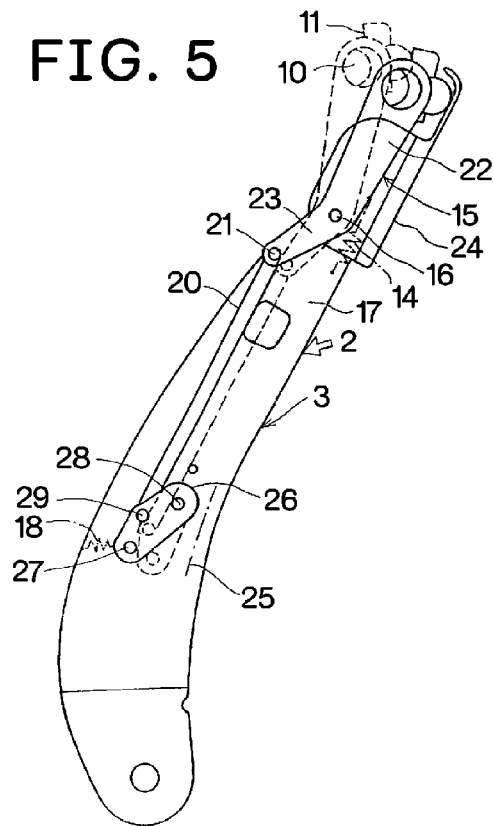
FIG. 5 is a side view of basic parts of a side frame of the seat back frame and the active head rest mechanism.

The upper link 15 is usually held at a position shown with a solid line in FIG. 5 by a elastic force or the like of the spring 14 and with this, the head rest 6 is also held at a normal position. However, if the upper link 15 rotates in the counterclockwise direction toward a position shown with a broken like, the head rest support portion 10 is moved forward and the head rest 6 is pushed out forward.

A laterally extending vehicle rear portion collision detecting body 25 is disposed between the side frames 17. If the vehicle seat 1 is moved forward with respect to a person seated on the seat by collision of a rear portion, the collision detecting body 25 is pushed by the person seated on the seat and moved backward. Both sides of the detecting body 25 are connected to lower links 26 and 26 by means of pins 27 and 27, respectively, and the lower links 26 and 26 are fixed to the side frames 17 by means of shafts 28 and 28. A lower end of each of the connecting rod 20 is connected to the lower link 26 by means of a pin 29. As shown in FIG. 5, one end of the lower spring 18 is connected to the lower link 26, the other end is connected to the side frame 17, and the lower link 26 is biased in the clockwise direction. With this, the collision detecting body 25 is held at a front normal position.

If collision of the rear portion occurs, the collision detecting body 25 is pushed by the person seated on the seat and is moved backward, the collision detecting body 25 rotates the lower link 26 in the counterclockwise direction in FIG. 5, and the collision detecting body 25 moves the connecting rod 20 downward. At that time, since a distance between the pin 29 and the shaft 28 is shorter than a distance between the pin 27 and the shaft 28, the backward movement of the collision detecting body 25 is efficiently transmitted to the connecting rod 20. The downward movement of the connecting rod 20 rotates the upper link 15 in the counterclockwise direction and with this, the head rest support portion 10 moves forward. At that time, since the upper long arm 22 of the upper link 15 is longer than the lower short arm 23, the head rest support portion 10 is moved forward efficiently by the downward movement of the connecting rod 20. The head rest 6 is pushed out forward by the forward movement of the support portion 10, and a head (neck) of a person seated on the seat is protected at the time of collision of the rear portion.

Each of the side frames 17 is made of metal plate having a predetermined width in the longitudinal direction, and a transmission mechanism which transmits the backward movement of the collision detecting body 25 to the head rest support portion 10 is disposed near the side frame 17. Therefore, the cushion 4 of the seat back 2 does not interfere the motion of the transmission mechanism. A mechanism from the collision detecting body 25 to the head rest support portion 10 is an active head rest mechanism.

Figure 4:
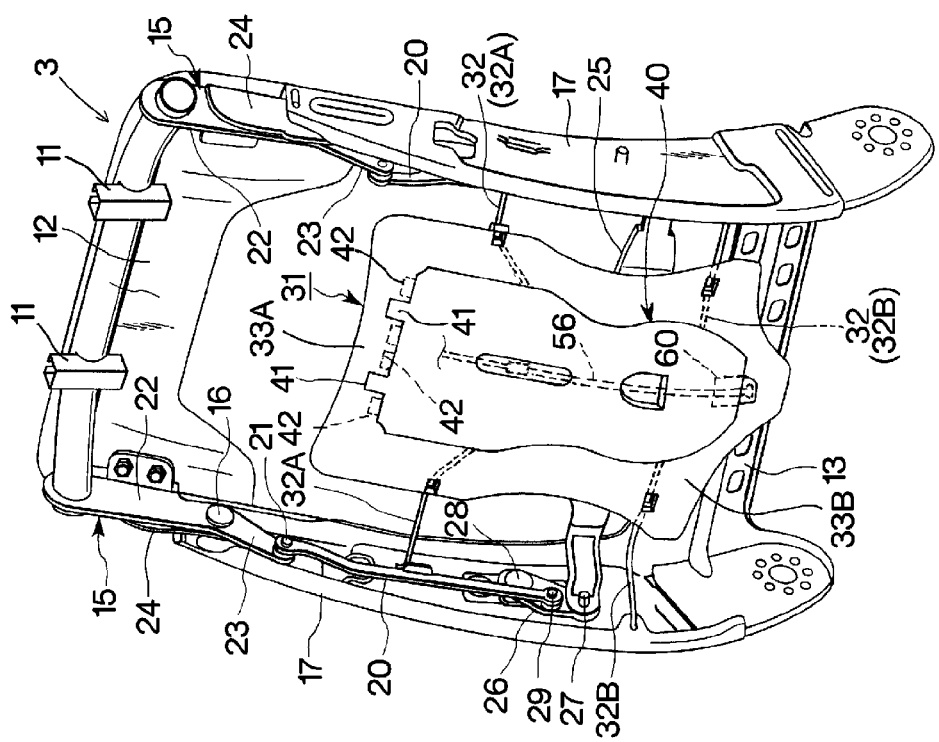
FIG. 4 is a perspective view showing a state where a cushion plate and an auxiliary plate are mounted.
Figure 6:
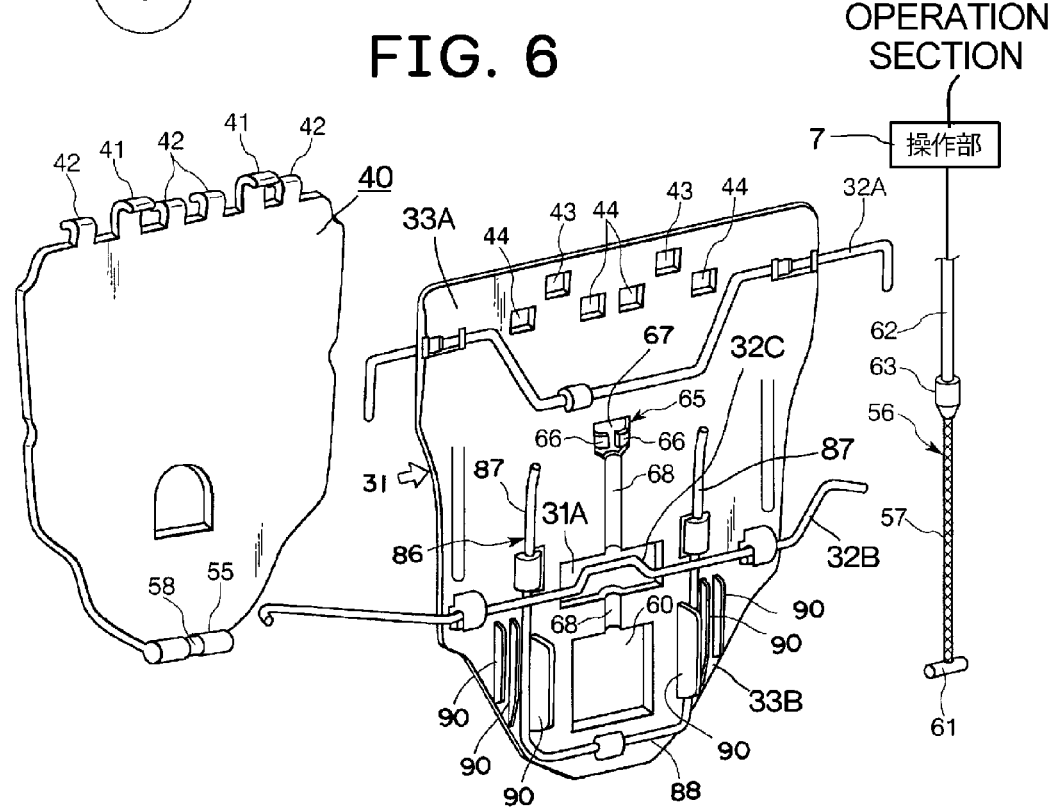
FIG. 6 is a perspective view showing the cushion plate, the auxiliary plate and a wire cable.

As shown in FIG. 4, a flexible cushion plate 31 is disposed inside of the back frame 3. The flexible cushion plate 31 is preferably made of synthetic resin such as polypropylene, and the plate 31 is substantially a single square plate in shape. A back surface of the cushion plate 31 is supported by seat springs 32 such as a zigzag spring or a formed wire spring. Each seat spring 32 at least includes an upper seat spring 32A and a lower seat spring 32B. A bent portion 32C is formed at a central portion of the lower seat spring 32B. As shown in FIG. 6, the bent portion 32C is located such that it can engage in the opening 31A formed in the cushion plate 31. Each seat spring 32 extends substantially laterally, and both ends of the seat spring 32 are connected to the side frames 17 of the seat back frame 3. The cushion plate 31 is provided at a location behind the seat back cushion 4. By engaging the bent portion 32C with the opening 31A, the seat spring 32B can excellently hold the cushion plate 31.

If the cushion plate 31 receives a load from a person seated on the seat, the cushion plate 31 is bent, the cushion plate 31 is moved backward against the elastic forces of the springs 32, and the cushion plate 31 flexibly supports the person seated on the seat. Since the cushion plate 31 supports the cushion 4 with a "surface" thereof, more excellent stability and comfortable feeling can be given to a person seated on the seat as compared with a conventional structure in which the cushion 4 is supported only by the seat springs 32.

The collision detecting body 25 is disposed behind the cushion plate 31 at a predetermined distance. Since the cushion plate 31 widely covers a back of a person seated on the seat, the cushion plate 31 receives a load of the person seated on the seat with a wide range and is moved backward at the time of collision of rear portion. A backward moving amount of the cushion plate 31 becomes the greatest between a vertically intermediate portion and a slightly lower portion thereof. Therefore, the collision detecting body 25 is preferably disposed at a vertically intermediate location of the cushion plate 31 or slightly lower location so that the collision detecting body 25 can reliably receive the backward movement of the cushion plate 31.

If the cushion plate 31 and the collision detecting body 25 are combined as described above, it is possible to expect excellent sitting feeling, hold feeling and reliable detection of collision of a rear portion.

Figure 7:
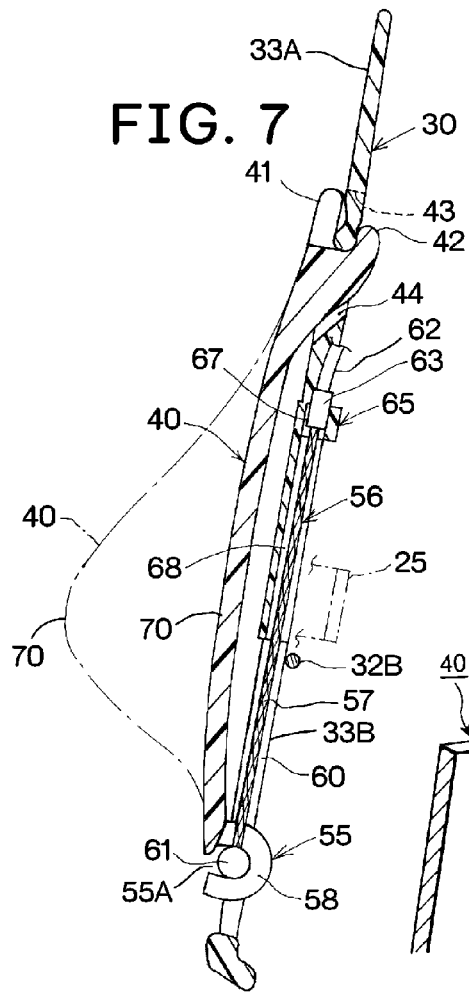
FIG. 7 is a sectional view of the assembled state shown in FIG. 6.
Figure 8:
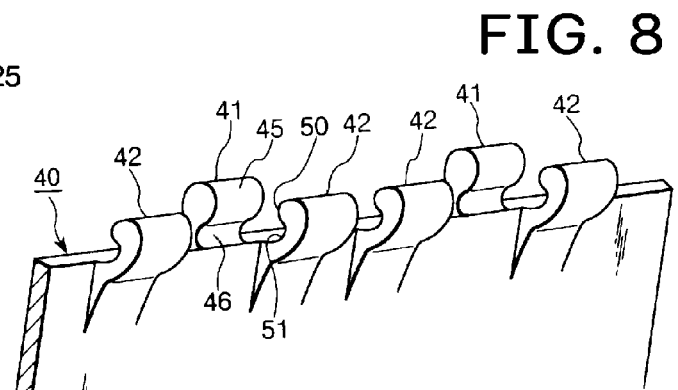
FIG. 8 is a perspective view showing an upper portion of the auxiliary plate.

A flexible auxiliary plate 40 is provided between the seat back cushion 4 and the cushion plate 31. The flexible auxiliary plate 40 is preferably made of synthetic resin such as polypropylene, and is a single square plate smaller than the cushion plate 31. The auxiliary plate 40 is mounted on the cushion plate 31, and is curved forward in accordance with operation of a person seated on the seat as shown in FIG. 7. If the auxiliary plate 40 is curved, the cushion 4 is pushed out forward, and a cushion pressure on the person seated on the seat is adjusted.

Figure 9:
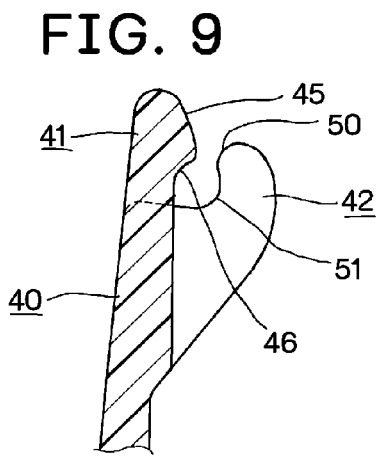
FIG. 9 is a sectional view of the upper portion of the auxiliary plate.

A plurality of backward hooks 41 and a plurality of forward hooks 42 are integrally formed on an upper portion of the auxiliary plate 40. Each backward hook 41 engages with an upper engaging hole 43 formed in the cushion plate 31, and each forward hook 42 engages with a lower engaging hole 44 formed in the cushion plate 31. As shown in FIG. 9, the backward hook 41 includes a backward inclined cam face 45 and a backward arc engaging face 46 which is continuously formed on the cam face 45. The forward hook 42 includes a forwardly inclined cam face 50 and a forward arc engaging face 51 which is continuously formed on the cam face 50.

Figure 10:
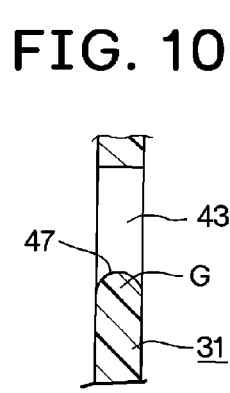
FIG. 10 is a partial sectional view of the cushion plate.
Figure 11:
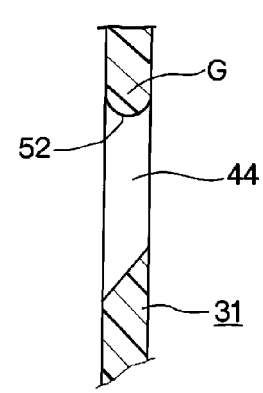
FIG. 11 is a partial sectional view of the cushion plate.
Figure 12:
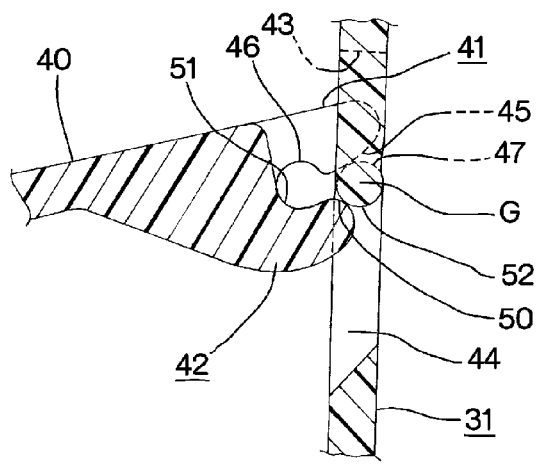
FIG. 12 is a sectional view showing a state immediately before the upper portion of the auxiliary plate is connected to the cushion plate.

A lower line of the upper engaging hole 43 is formed into an arc edge 47 which projects upward as shown in FIG. 10, and an arc engaging face 46 of the backward hook 41 is fitted to the arc edge 47. An upper line of the lower engaging hole 44 is formed into an arc edge 52 which projects downward as shown in FIG. 11, and an arc engaging face 51 of the forward hook 42 is fitted to the arc edge 52. A shaft center of the arc edge 47 of the upper engaging hole 43 matches with a shaft center of the arc edge 52 of the lower engaging hole 44 at a center line G. With this, the arc edge 47 and the arc edge 52 form one round rod as shown in FIG. 12. A diameter of the round rod is set equal to or slightly shorter than a distance between the arc engaging face 46 and the arc engaging face 51.

Figure 13:
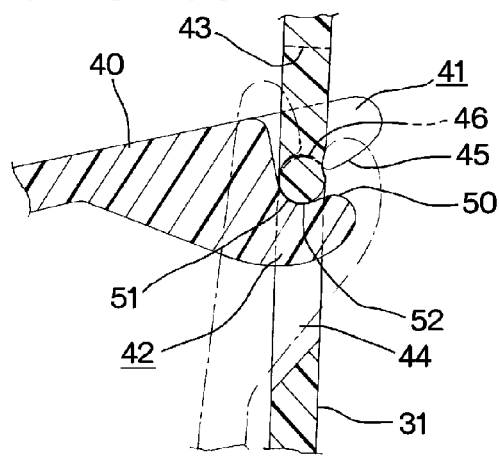
FIG. 13 is a sectional view showing a state in which the upper portion of the auxiliary plate is connected to the cushion plate.
Figure 14:
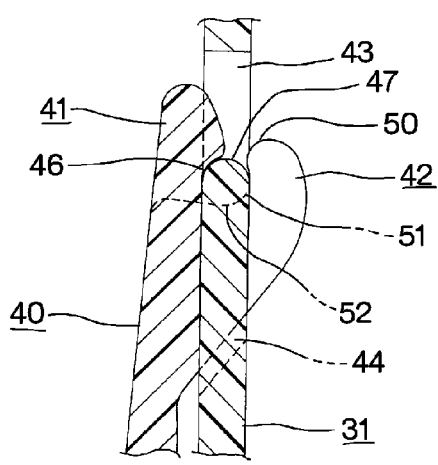
FIG. 14 is a sectional view showing a relation between a backward hook and an upper engaging hole when the auxiliary plate and the cushion plate are brought in parallel to each other.
Figure 15:
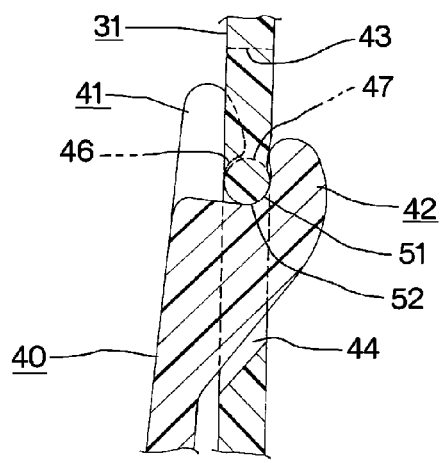
FIG. 15 is a sectional view showing a relation between a forward hook and a lower engaging hole when the auxiliary plate and the cushion plate are brought in parallel to each other.
Figure 16:
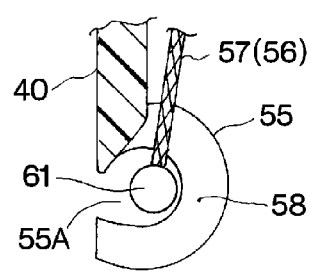
FIG. 16 is a sectional view showing a lower engaging portion of the auxiliary plate and a wire cable.
Figure 17:
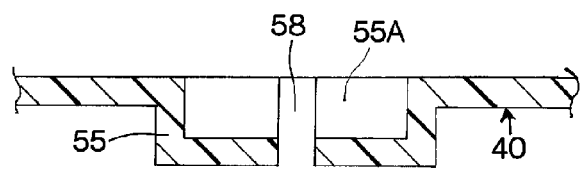
FIG. 17 is a sectional view of the auxiliary plate and the lower engaging portion.

As shown in FIG. 12, if the backward hook 41 and the forward hook 42 are respectively inserted into the upper engaging hole 43 and the lower engaging hole 44 of the cushion plate 31 in a state where the auxiliary plate 40 is set substantially horizontally and the auxiliary plate 40 is moved backward, the inclined cam face 45 of the backward hook 41 abuts against the arc edge 47 of the upper engaging hole 43, the inclined cam face 50 of the forward hook 42 abuts against the arc edge 52 of the lower engaging hole 44, a distance between the backward hook 41 and the forward hook 42 is resiliently widened. Then, the arc engaging face 46 of the backward hook 41 and the arc engaging face 51 of the forward hook 42 are respectively fitted to the arc edge 47 and the arc edge 52 as shown in FIG. 13. Then, if the auxiliary plate 40 is rotated such that it becomes parallel to the cushion plate 31, the mounting operation of the upper portion of the auxiliary plate 40 and the cushion plate 31 is completed.

The auxiliary plate 40 is formed at its lower portion with a lower engaging portion 55 which projects backward. A cable head 61 of an inner cable 57 of a wire cable 56 is locked to the lower engaging portion 55. The wire cable 56 is connected to an operating section 7 provided on the vehicle seat 1. The lower engaging portion 55 includes an accommodation recess 55A in which the cable head 61 can be accommodated, and a slit 58 through which the inner cable 57 can pass.

The cushion plate 31 is formed at its lower portion with a lower guide slot 60 with which the lower engaging portion 55 slidably engages. If the cable head 61 is vertically moved in accordance with operation of a person seated on the seat, the lower engaging portion 55 is guided by the slot 60 and smoothly and moves vertically without rattling. Therefore, the width of the lower engaging portion 55 and the width of the slot 60 are appropriately set such that they do not rattle.

The cushion plate 31 is provided with a tube holder 65 which holds a tip end 63 of an outer tube 62 of the wire cable 56. The tube holder 65 preferably includes a recess 67 formed in the cushion plate 31, and a pair of holding arms 66. A dent passage 68 is formed in a back surface of the cushion plate 31 between the tube holder 65 and the lower guide slot 60. An inner cable 57 is disposed in the dent passage 68.

If a person seated on the seat operates the operating section 7 to move the cable head 61 upward, the lower engaging portion 55 is guided by the slot 60 and moves upward smoothly without rattling, the cushion 4 is pushed out forward by the curve of the auxiliary plate 40 as shown in FIG. 7, and a cushion pressure on the person seated on the seat is adjusted.

Figure 22:
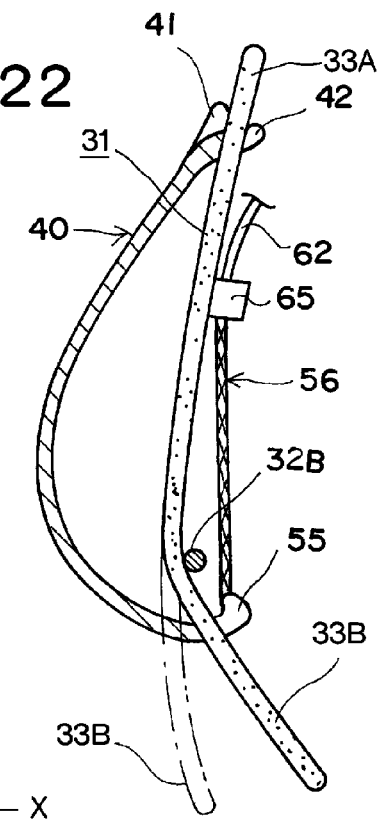
FIG. 22 is a sectional view showing a state where the lower plate of the cushion plate shown in FIG. 21 is pushed out backward.

The cushion plate 31 includes an upper plate 33A and a lower plate 33B. The upper plate 33A and the lower plate 33B are substantially defined by the lower seat spring 32B. If a person seated on the seat sits on the seat in an appropriate state, the lower plate 33B which is lower than the lower seat spring 32B largely projects backward beyond the lower seat spring 32B by a normal pressure from the person seated on the seat as shown in FIGS. 20 and 22.

The lower plate 33B can support a sacrum area of the person seated on the seat, and support a hip area of the person seated on the seat.

The cushion plate 31 is single plate made of synthetic resin. The lower plate 33B is lower than the lower seat spring 32B.

The lower plate 33B has such a sufficiently excellent elasticity that if the lower plate 33B receives a load from a person seated on the seat, the lower plate 33B can move backward beyond the lower seat spring 32B. Therefore, the hip area and the waist area can come into contact with the seat back 2 at an appropriate pressure, and excellent comfortable feeling can be obtained.

To satisfy the condition, it is desirable that the lower plate 33B has more excellent elasticity with respect to the lower seat spring 32B.

Figure 23:
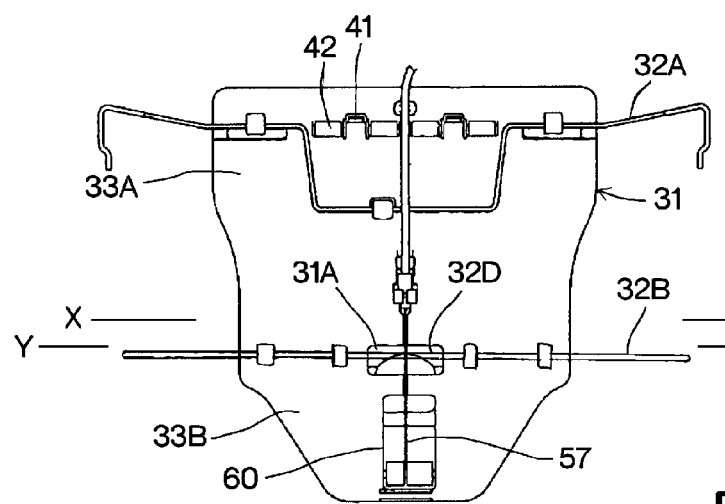
FIG. 23 is a back view of the cushion plate provided with a lower seat spring extending substantially horizontally.
Figure 24:
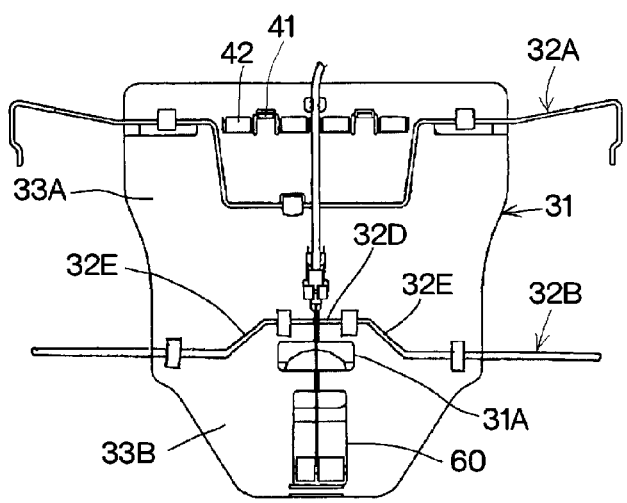
FIG. 24 is a back view of a cushion plate provided with a lower seat spring including a lower inclining portion.

The lower seat spring 32B includes a laterally long central portion 32D located behind the cushion plate 31. The shape of the lower seat spring 32B is relatively free. The lower seat spring 32B shown in FIG. 23 is formed into substantially straight shape as a whole. The lower seat spring 32B in FIG. 24 has short lower inclining portions 32E inclining downward from left and right sides of the central portion 32D. The lower seat spring 32B in FIG. 25 has short upper inclining portions 32F inclining upward from left and right sides of the central portion 32D. The inclining portion 32E and F increase the contact area between the seat spring 32B and the cushion plate 31, and make it possible to excellently hold the cushion plate 31.

The bent portion 32C is formed on the central portion 32D if desired. The cushion plate 31 is formed with the opening 31A which engages with the bent portion 32C. The engagement between the bent portion 32C and the opening 31A prevents the lower seat spring 32B and the cushion plate 31 from deviating vertically and laterally in position. The opening 31A enhance the bending performance of a boundary between the upper plate 33A and the lower plate 33B, and makes it easy to bend the lower plate 33 backward.

A back side of the cushion plate 31 is provided with a U-shaped support spring 86. By slightly changing elasticity or shape of the support spring 86, it is possible to easily change the flexibility of the lower plate 33B.

The support spring 86 includes vertical springs 87 and a lateral spring 88 which is connected to lower portions of the vertical spring 87. The lateral spring 88 is located lower than the lower guide slot 60. The vertical springs 87 are located on both sides of the lower guide slot 60. An upper end of each of the vertical springs 87 extends upward beyond the lower seat spring 32B, abuts against the upper plate 33A so that the flexibility of the lower plate 33B can be adjusted. The lateral spring 88 located lower than the lower guide slot 60 can easily and correctly set the elasticity of the lower plate 33B.

It is also possible to form vertically extending ribs 90 on the back side of the lower plate 33B. The vertical spring 87 is accommodated between the ribs 90. The rib 90 reduces the elasticity from the lower plate 33B, but the lower plate 33B is bent with respect to the upper plate 33A, and the rib 90 projects backward beyond the lower seat spring 32B.

The auxiliary plate 40 swells forward by pulling the wire cable 56, the cushion 4 is pushed out forward and the cushion pressure on a person seated on the seat is adjusted. However, it is not preferable that the maximum forward projecting portion of the auxiliary plate 40 is vertically varied by influence of a pressure received by a person seated on the seat. Excellent comfortable feeling can not be obtained, for example, if a relatively light-weighted woman operates the auxiliary plate 40, the upper portion of the auxiliary plate 40 projects forward, and if a man of a large build operates the auxiliary plate 40, the lower portion of the auxiliary plate 40 projects forward.

Therefore, the auxiliary plate 40 is formed with a pushing portion 70 which can easily swell forward, and the position of the maximum forward projecting portion of the auxiliary plate 40 is stabilized by the pushing portion 70. The structure of the pushing portion 70 is not limited. One example of the structure thereof will be explained below. The thickness of the pushing portion 70 of the auxiliary plate 40 in FIGS. 28 and 29 is thinner than the other auxiliary plate 40. With this, the weak pushing portion 70 projects forward preferentially. A pushing portion 70 in FIG. 30 includes one or more slits 71. The strength of the pushing portion 70 is lowered by the slits 71. A pushing portion 70 in FIG. 31 has an elliptic hole 73. Notches 74 are formed on both sides of the auxiliary plate 40. An auxiliary plate 40 in FIG. 32 is formed at its back side with a plurality of ribs 75. The ribs 75 are disposed such as to go around the pushing portion 70. With this, the auxiliary plate 40 can easily be bent around the pushing portion 70, and the maximum forward projecting portion is stabilized.

The position of the pushing portion 70, to be precise, the preferable position is vertically varied by a figure of a person seated on the seat. Generally, a man of a large build desires to set the pushing portion 70 upward and a small person seated on the seat desires to set the pushing portion 70 downward, but it is difficult to satisfy these requirements by an inexpensive mechanism. However, it is possible to stabilize the position of the pushing portion 70 even with the inexpensive mechanism. For example, if the pushing portion 70 is pushed out forward by operating the operating section 7, the pushing portion 70 is gradually moved upward or gradually moved downward in some cases. Such instability can be reduced by increasing a distance K between the upper end of the auxiliary plate 40 and the pushing portion 70 and by reducing a distance L between the lower end of the auxiliary plate 40 and the pushing portion 70.

In the above description, the upper end of the auxiliary plate 40 is a mounting portion between the auxiliary plate 40 and the cushion plate 31, and this is substantially equal to the center line G. The lower end of the auxiliary plate 40 is equal to the lower engaging portion 55. When the pushing portion 70 of the auxiliary plate 40 is pushed out forward, the pushing portion 70 can not move horizontally. However, when the distance K is long, the pushing portion 70 can move on the arc around the center line G with a large radius. Therefore, as the distance K is longer, the pushing portion 70 can move forward on almost horizontal track and with this, unlikable upward or downward large movement of the pushing portion 70 when the pushing portion 70 moves forward can be suppressed.

Each auxiliary plate 40 shown in FIGS. 28 to 32 includes bending means for enhancing the bending performance of the pushing portion 70, e.g., a slit, a hole and a rib. On the other hand, each auxiliary plate 40 shown in FIGS. 33 to 35 includes both the bending means and bending-restricting means.

Figure 34:
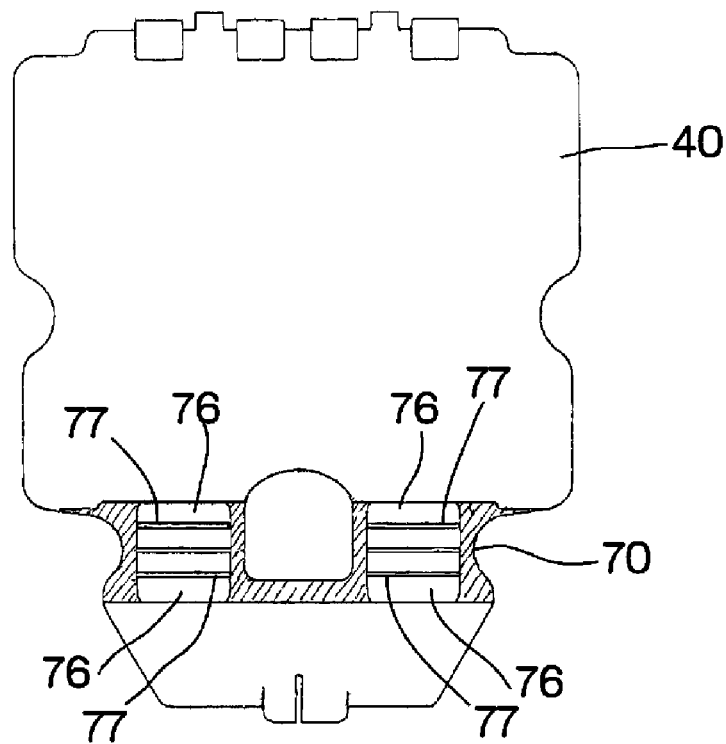
FIG. 34 is a back view of the auxiliary plate having the bending means and the bending-restricting means.
Figure 35:
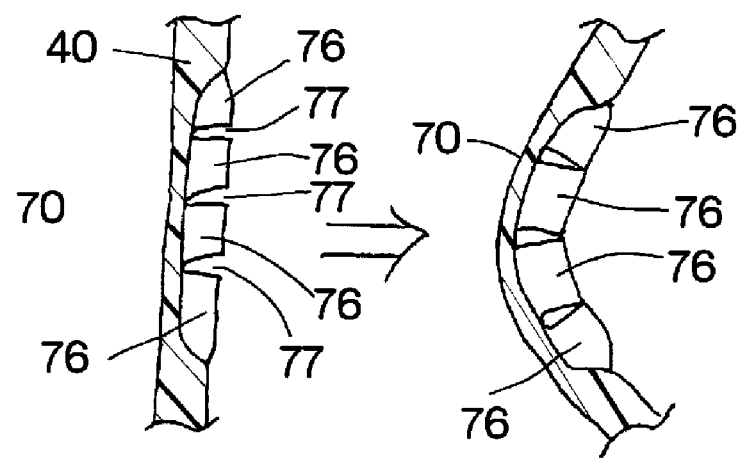
FIG. 35 is an enlarged sectional view of the bending means and the bending-restricting means.

The bending means of the auxiliary plate 40 shown in FIGS. 33 to 35 can use the same bending means of the auxiliary plate 40 shown in FIGS. 28 to 32, but the thinner pushing portion 70 is shown in FIGS. 33 to 35. The bending-restricting means includes a plurality of vertically arranged blocks 76 provided at locations corresponding to the pushing portions 70. An appropriate gap 77 is formed between the blocks 76 when the auxiliary plate 40 is substantially straight as shown in FIGS. 33 and 35, but if the pushing portion 70 of the auxiliary plate 40 is pushed out forward and the auxiliary plate 40 is curved, the blocks 76 abut against each other as shown in FIG. 36, and excessive curve of the auxiliary plate 40 is restricted. Since the blocks 76 are not in abutment against each other in a normal state, the curve of the auxiliary plate 40 is not restricted at all, but the blocks 76 can reliably restrict the excessive curve of the auxiliary plate 40 beyond the set value with a simple structure.

If the shape of each block 76 is changed, timing at which the blocks 76 abut against each other can slightly be adjusted. By adjusting the timing, the curved shape when the auxiliary plate 40 is curved maximum can match a previously designed shape, and more excellent comfort feeling can be obtained.

(Operation)

As shown in FIG. 12, the auxiliary plate 40 is brought into the substantially horizontal state, and the auxiliary plate 40 is moved backward, the backward hook 41 and the forward hook 42 are respectively inserted into the upper engaging hole 43 and the lower engaging hole 44 of the cushion plate 31. With this the inclined cam face 45 of the backward hook 41 abuts against the arc edge 47 of the upper engaging hole 43, the inclined cam face 50 of the forward hook 42 abuts against the arc edge 52 of the lower engaging hole 44, a distance between the backward hook 41 and the forward hook 42 is resiliently widened and then, the arc engaging face 46 of the backward hook 41 and the arc engaging face 51 of the forward hook 42 are fitted to the arc edge 47 and the arc edge 52, respectively, as shown in FIG. 13.

Then, if the auxiliary plate 40 is rotated such that it becomes parallel to the cushion plate 31, the mounting operation of the upper portion of the auxiliary plate 40 and the cushion plate 31 is completed. At that time, the shaft center of the arc edge 47 and the shaft center of the arc edge 52 of the lower engaging hole 44 match each other at the center line G. With this, as shown in FIG. 12, the arc edge 47 and the arc edge 52 form one round rod in appearance. Therefore, the auxiliary plate 40 can smoothly rotate around the round rod.

The arc engaging face 46 and the arc engaging face 51 abut against the arc edge 47 and the arc edge 52 from opposite directions from each other. Therefore, the upper portion of the auxiliary plate 40 is connected to the cushion plate 31 with sufficient connection strength without deteriorating smooth rotation function of the auxiliary plate 40. Since the hooks 41 and 42 and the engaging holes 43 and 44 are used, it is possible to extremely easily mount the upper portion of the auxiliary plate 40 on the cushion plate 31.

If the upper portion of the auxiliary plate 40 is mounted on the cushion plate 31, the cable head 61 of the wire cable 56 is engaged with the lower engaging portion 55 of the auxiliary plate 40. The inner cable 57 of the wire cable 56 extending upward through the slit 58 of the lower engaging portion 55 is disposed in the dent passage 68 formed in the back surface of the cushion plate 31, and the tip end 63 of the outer tube 62 is engaged with the tube holder 65. At that time, since the inner cable 57 is disposed in the dent passage 68 formed in the back surface of the cushion plate 31, the lower engaging portion 55 with which the cable head 61 is engaged stays in the lower guide slot 60 of the cushion plate 31, and the lower engaging portion 55 is rationally prevented from separating forward from the lower guide slot 60.

If a person seated on the seat operates the operating section 7 and upwardly move the cable head 61, the lower engaging portion 55 is guided by the slot 60 and is smoothly moved upward without rattling.

When the auxiliary plate 40 is connected to the cushion plate 31 and the wire cable 56, it is unnecessary to use independent shafts, pins or screws. Therefore, the cost can be reduced. The tube holder 65 which holds the tip end 63 of the outer tube 62 is formed in the cushion plate 31, the tip end 63 can be embedded directly in the cushion plate 31, and since the inner cable 57 can be accommodated in the dent passage 68 of the cushion plate 31, thicknesses required for the cushion plate 31 and the wire cable 56 can be reduced. Since the inner cable 57 accommodated in the dent passage 68 does not substantially interfere with the collision detecting body 25, the wire cable 56 does not affect the performance of the active head rest mechanism.

However, in the normal state, the auxiliary plate 40 is in parallel to the cushion plate 31 so that a forward pressure caused by the auxiliary plate 40 is not applied to the cushion 4. In this state, the lower engaging portion 55 of the auxiliary plate 40 is located at the lowermost portion of the lower guide slot 60. If the operating section 7 is operated to move the cable head 61 upward, the lower engaging portion 55 is guided by the slot 60 and smoothly moves upward without rattling. With this, the auxiliary plate 40 projects forward as shown in FIG. 7, and moves the cushion 4 forward. By curving the auxiliary plate 40 by the operating section 7 in this manner, it is possible to provide a person seated on the seat with a desired seat shape.

The cushion plate 31 is the single plate made of synthetic resin, and the lower plate 33B which is lower than the lower seat spring 32B has sufficiently excellent elasticity to move backward beyond the lower seat spring 32B when it receives a load from a person seated on the seat. Thus, a hip area and a waist area can come into contact with the seat back 2 at an appropriate pressure, and excellent comfortable feeling can be obtained.

According to the conventional technique, if the auxiliary plate is mounted on the cushion plate, the performance of the active head rest mechanism is affected in some cases, but according to the structure of the present invention, since the cushion plate 31 is mounted on the side frames 17 by the seat spring 32, even if the cushion pressure is changed by the auxiliary plate 40, the cushion plate 31 moves independently from the collision detecting body 25, and even if the auxiliary plate 40 is mounted on the cushion plate 31, the performance of the active head rest mechanism is not affected.

The invention claimed is:

1. A vehicle seat comprising:
a square seat back frame having a pair of side frames;
upper and lower seat springs mounted between the side frames;
a single plate-like flexible cushion plate having a back surface mounted on the seat springs;
a seat back cushion provided on a front side of the cushion plate;
a single plate-like flexible auxiliary plate provided between the seat back cushion and the cushion plate and mounted on the cushion plate, the auxiliary plate having an elasticity such that when the auxiliary plate is deformed into a curved shape, a portion of the auxiliary plate projects forward, thus causing the auxiliary plate to push out the seat back cushion forward;
wherein the cushion plate includes an upper portion located higher than the lower seat spring and a lower portion located lower than the lower seat spring; and
wherein the lower portion has an elastic force such that when the lower portion receives, through the seat back cushion, pressure from a person properly seated on the seat, the lower portion can move backward by a greater distance than the distance of rearward movement of the lower seat spring.

2. The vehicle seat according to claim 1, further comprising a support spring mounted on a back side of the cushion plate and extending from the lower portion to the upper portion to adjust the elastic force of the lower plate by varying elasticity oir shape of the support spring.

3. The vehicle seat according to claim 1, wherein the auxiliary plate is provided with bending means which enhances forward curving performance.

4. The vehicle seat according to claim 3, wherein an upper portion of the auxiliary plate is rotatably mounted on the cushion plate, and a distance between the upper portion of the auxiliary plate and the bending means is longer than a distance between a lower portion of the auxiliary plate and the bending means.

5. The vehicle seat according to claim 1, wherein the auxiliary plate is provided with bending-restricting means which restrict forward excessive curve.

6. The vehicle seat according to claim 5, wherein the bending-restricting means guides the auxiliary plate such that the auxiliary plate assumes a preset predetermined shape when the auxiliary plate curves forward.

7. A vehicle seat comprising:
a square seat back frame having a pair of side frames;
upper and lower seat springs mounted between the side frames;
a single plate-like flexible cushion plate having a back surface mounted on the seat springs;
a seat back cushion provided on a front side of the cushion plate;
a guide slot defined in the flexible cushion plate on an opposite side of the lower seat spring with respect to the upper seat spring;
a single plate-like flexible auxiliary plate provided between the seat back cushion and the cushion plate and mounted on the cushion plate, said auxiliary plate comprising a lower engaging portion at a lower end thereof, the lower engaging portion slidably engaged in the guide slot of the flexible cushion plate;
an actuation member connected at one end to said lower engaging portion, the actuation member to be actuated to move the lower engaging portion upwardly within the guide slot, thereby deforming the auxiliary plate into a curved shape such that a portion of the auxiliary plate projects forward, thus causing the auxiliary plate to push out the seat back cushion forward;
wherein the cushion plate includes an upper portion located higher than the lower seat spring and a lower portion located lower than the lower seat spring; and
wherein the lower portion has an elastic force such that when the lower portion receives, through the seat back cushion and via the auxiliary plate, pressure from a person properly seated on the seat, the lower portion can move backward by a greater distance than the distance of rearward movement of the lower seat spring.

8. The vehicle seat according to claim 7, further comprising a support spring mounted on a back side of the cushion plate and extending from the lower portion to the upper portion to adjust the elastic force of the lower plate by varying elasticity oir shape of the support spring.

9. The vehicle seat according to claim 7, wherein the auxiliary plate is provided with bending means which enhances forward curving performance.

10. The vehicle seat according to claim 9, wherein an upper portion of the auxiliary plate is rotatably mounted on the cushion plate, and a distance between the upper portion of the auxiliary plate and the bending means is longer than a distance between a lower portion of the auxiliary plate and the bending means.

11. The vehicle seat according to claim 7, wherein the auxiliary plate is provided with bending-restricting means which restrict forward excessive curve.

12. The vehicle seat according to claim 11, wherein the bending-restricting means guides the auxiliary plate such that the auxiliary plate assumes a preset predetermined shape when the auxiliary plate curves forward.

* * * * *